(12) United States Patent
Takayama et al.

(10) Patent No.: US 12,051,945 B2
(45) Date of Patent: Jul. 30, 2024

(54) MOTOR, FAN, AND AIR CONDITIONER

(71) Applicant: DAIKIN INDUSTRIES, LTD., Osaka (JP)

(72) Inventors: Yoshinori Takayama, Osaka (JP); Norimasa Matsushita, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 18/123,714

(22) Filed: Mar. 20, 2023

(65) Prior Publication Data

US 2023/0231450 A1    Jul. 20, 2023

Related U.S. Application Data

(63) Continuation of application No. PCT/JP2021/034584, filed on Sep. 21, 2021.

(30) Foreign Application Priority Data

Sep. 25, 2020  (JP) .................................. 2020-161370

(51) Int. Cl.
  *H02K 1/2791* (2022.01)
  *H02K 1/27* (2022.01)
  (Continued)

(52) U.S. Cl.
  CPC ............ *H02K 1/2791* (2022.01); *H02K 1/27* (2013.01); *H02K 1/2789* (2022.01); *H02K 1/279* (2022.01);
  (Continued)

(58) Field of Classification Search
  CPC ............ H02K 15/03; H02K 1/27; H02K 7/14; H02K 1/2791; H02K 1/28; H02K 1/276;
  (Continued)

(56) References Cited

U.S. PATENT DOCUMENTS

2001/0048260 A1* 12/2001 Shiga ................... H02K 1/2791
                                                310/156.01
2006/0103253 A1   5/2006 Shiga et al.
(Continued)

FOREIGN PATENT DOCUMENTS

JP   2008-99520 A   4/2008
JP   2008-199697 A  8/2008
(Continued)

OTHER PUBLICATIONS

Shiga Takeshi, Outer Rotor Permanent Magnet Motor, Oct. 23, 2008, JP 2008259359 (English Machine Translation) (Year: 2008).*
(Continued)

*Primary Examiner* — Alexander A Singh
(74) *Attorney, Agent, or Firm* — Global IP Counselors, LLP

(57) ABSTRACT

A motor includes a rotor molded by resin casting, and a stator disposed inside the rotor. The rotor includes a cylindrical portion in which a plurality of magnets are arranged side by side in a circumferential direction. The magnets are exposed on a side of an open end as one end of the cylindrical portion in an axial direction of the cylindrical portion. The cylindrical portion includes an inner resin located inside each of the magnets in a radial direction of the cylindrical portion. The inner resin includes a first resin portion, and a second resin portion closer to the open end than the first resin portion in the axial direction. A sectional area of the second resin portion perpendicular to the axial direction is smaller than a sectional area of the first resin portion perpendicular to the axial direction.

13 Claims, 13 Drawing Sheets

(51) Int. Cl.
- *H02K 1/2789* (2022.01)
- *H02K 1/279* (2022.01)
- *H02K 15/03* (2006.01)
- *F24F 1/0029* (2019.01)
- *H02K 7/14* (2006.01)

(52) U.S. Cl.
CPC ............ *H02K 15/03* (2013.01); *F24F 1/0029* (2013.01); *H02K 7/14* (2013.01)

(58) Field of Classification Search
CPC .... H02K 1/2786; H02K 1/279; H02K 1/2787; H02K 1/2789; H02K 2213/03; F24F 1/0029; F04D 19/002; F04D 25/0633; F04D 25/064
USPC .............................. 310/156.1, 156.01, 156.23
See application file for complete search history.

(56) References Cited

U.S. PATENT DOCUMENTS

| | | | |
|---|---|---|---|
| 2006/0119204 A1 | 6/2006 | Awazu et al. | |
| 2006/0250041 A1* | 11/2006 | Adaniya | H02K 29/03 310/156.53 |
| 2008/0191573 A1 | 8/2008 | Kihara et al. | |
| 2010/0207482 A1* | 8/2010 | Kim | H02K 3/345 310/216.007 |
| 2019/0093932 A1* | 3/2019 | Cho | H02M 7/48 |
| 2020/0056821 A1* | 2/2020 | Hirosawa | F25B 49/022 |
| 2020/0177114 A1* | 6/2020 | Hirosawa | H02P 27/085 |
| 2023/0231450 A1* | 7/2023 | Takayama | F04D 25/0633 310/156.01 |

FOREIGN PATENT DOCUMENTS

| | | |
|---|---|---|
| JP | 2008-259359 A | 10/2008 |
| JP | 2008259359 A * | 10/2008 |
| WO | 2017/183378 A1 | 10/2017 |

OTHER PUBLICATIONS

International Search Report of corresponding PCT Application No. PCT/JP2021/034584 dated Nov. 16, 2021.

International Preliminary Report of corresponding PCT Application No. PCT/JP2021/034584 dated Apr. 6, 2023.

European Search Report of corresponding EP Application No. 21 87 2435.9 date Jan. 17, 2024.

* cited by examiner

MOTOR, FAN, AND AIR CONDITIONER

CROSS-REFERENCE TO RELATED APPLICATIONS

This is a continuation of International Application No. PCT/JP2021/034584 filed on Sep. 21, 2021, which claims priority to Japanese Patent Application No. 2020-161370, filed on Sep. 25, 2020. The entire disclosures of these applications are incorporated by reference herein.

BACKGROUND

Technical Field

The present invention relates to a motor, a fan, and an air conditioner.

Background Art

As disclosed in WO 2017/183378 A, there is known a rotor that is used in an outer rotor type motor and is molded by injecting resin into a mold into which a magnet or the like is inserted.

SUMMARY

A motor according to a first aspect includes a rotor molded by resin casting, and a stator disposed inside the rotor. The rotor includes a cylindrical portion in which a plurality of magnets are arranged side by side in a circumferential direction. The magnets are exposed on a side of an open end as one end of the cylindrical portion in an axial direction of the cylindrical portion. The cylindrical portion includes an inner resin located inside each of the magnets in a radial direction of the cylindrical portion. The inner resin includes a first resin portion, and a second resin portion closer to the open end than the first resin portion in the axial direction. A sectional area of the second resin portion perpendicular to the axial direction is smaller than a sectional area of the first resin portion perpendicular to the axial direction.

BRIEF DESCRIPTION OF THE DRAWINGS

FIG. 6 is a sectional view taken along line A-A in FIG. 4.
FIG. 7 is a sectional view taken along line B-B in FIG. 4.
FIG. 12 is a sectional view taken along line C-C in FIG. 4.
FIG. 13 is a sectional view taken along line C-C in FIG. 4.

DETAILED DESCRIPTION OF EMBODIMENT(S)

(1) Configuration of Air Conditioner 200

Figure 1:
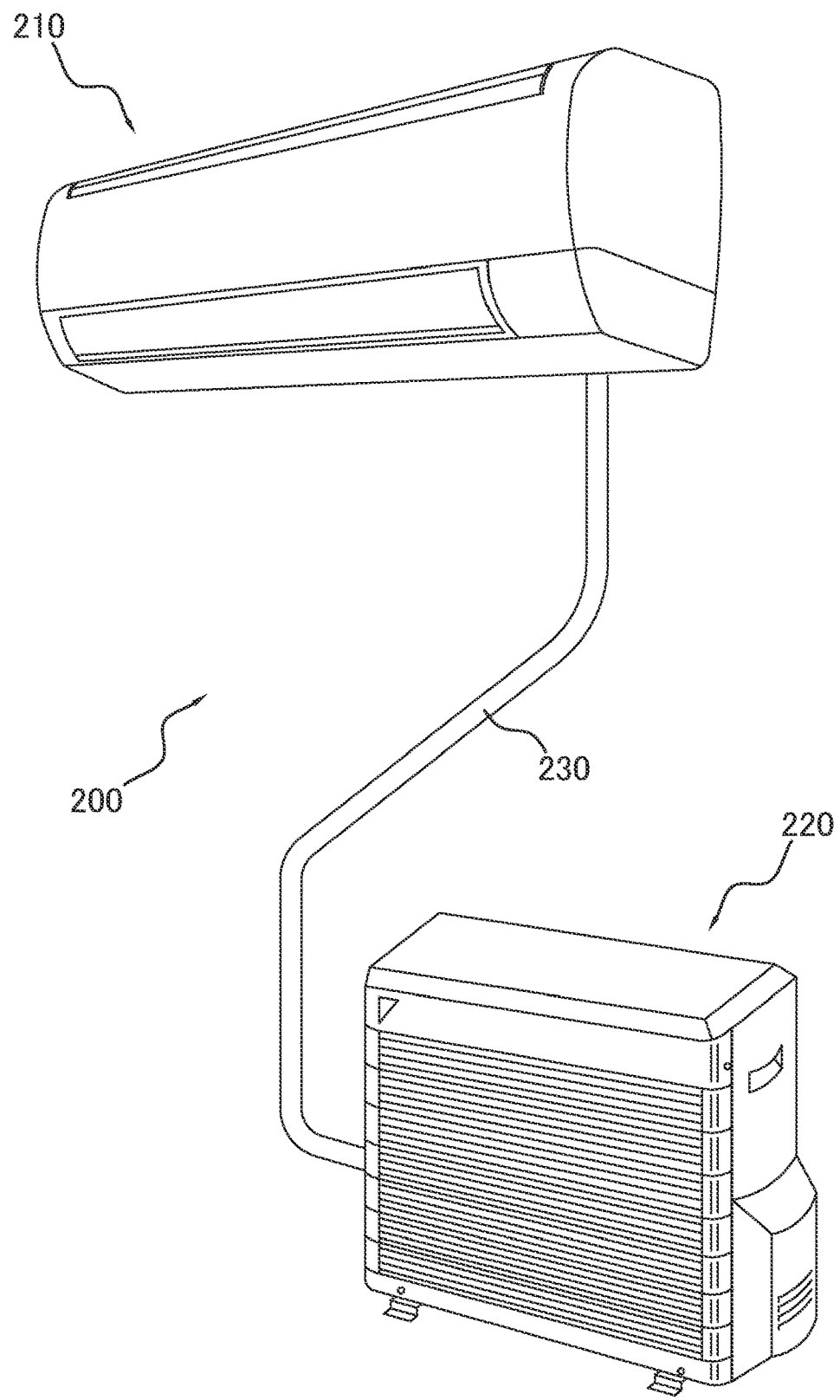
FIG. 1 is an external view of an air conditioner 200.

As shown in FIG. 1, an air conditioner 200 mainly includes an indoor unit 210 attached to an indoor wall surface or the like, and an outdoor unit 220 installed outdoors. The indoor unit 210 and the outdoor unit 220 are connected to each other via a refrigerant pipe 230 to constitute a refrigerant circuit of the air conditioner 200. The air conditioner 200 performs cooling operation, heating operation, and the like in a space in which the indoor unit 210 is installed.

Figure 2:
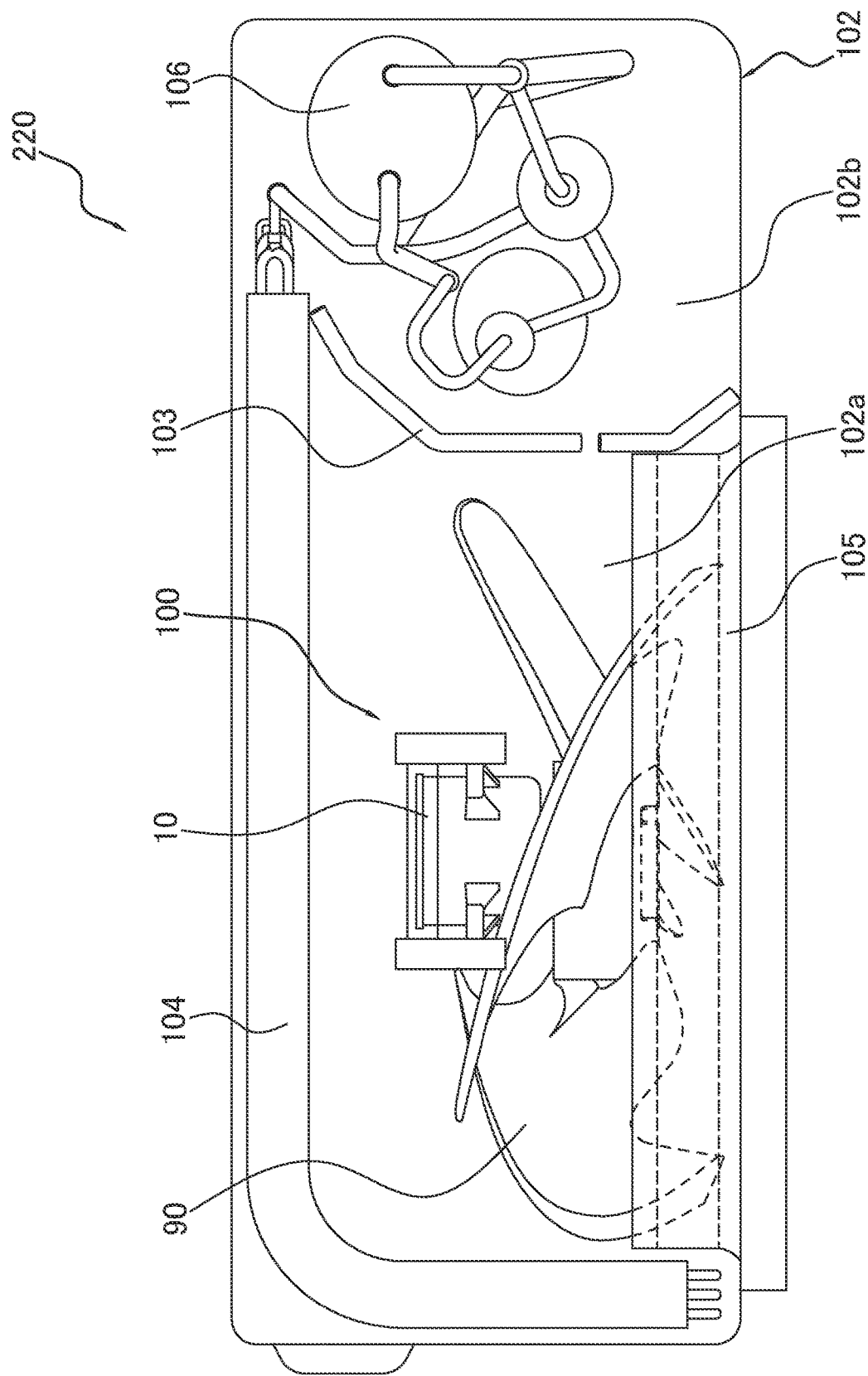
FIG. 2 is a schematic sectional view of an outdoor unit 220.

A motor 10 according to the embodiment is used for a fan 100. The outdoor unit 220 of the air conditioner 200 includes the fan 100. As shown in FIG. 2, the outdoor unit 220 mainly includes the fan 100, a casing 102, a heat exchanger 104, a compressor 106, an internal pipe, and a control unit. The casing 102 accommodates the fan 100, a partition plate 103, the heat exchanger 104, a bell mouth 105, the compressor 106, and the like. The internal pipe is a part of the refrigerant circuit of the air conditioner 200, and is a pipe through which a refrigerant circulating in the refrigerant circuit flows. The control unit is a microcomputer including a CPU, a memory, and the like. The control unit controls the motor 10 and the like of the fan 100.

The partition plate 103 partitions a space inside the casing 102 into a fan chamber 102a and a machine chamber 102b. The fan 100, the heat exchanger 104, and the bell mouth 105 are disposed in the fan chamber 102a. The compressor 106 and the control unit are disposed in the machine chamber 102b.

The compressor 106 compresses the refrigerant circulating in the refrigerant circuit of the air conditioner 200. The refrigerant compressed by the compressor 106 is sent to the heat exchanger 104 of the outdoor unit 220 during the cooling operation, and is sent to the heat exchanger of the indoor unit 210 during the heating operation.

The heat exchanger 104 causes heat exchange between the refrigerant and air. The heat exchanger 104 includes, for example, a heat transfer tube folded back a plurality of times at both ends in a longitudinal direction of the heat exchanger 104 and a fin attached to the heat transfer tube. The heat transfer tube is a part of the refrigerant circuit of the air conditioner 200, and is a pipe through which the refrigerant circulating in the refrigerant circuit flows. The heat exchanger 104 causes heat exchange between the refrigerant flowing inside the heat transfer tube and air passing through the fin. The heat exchanger 104 functions as a condenser (radiator) during the cooling operation, and functions as an evaporator (heat absorber) during the heating operation.

The fan 100 mainly includes the motor 10 and a blade 90. The blade 90 is a propeller fan that is driven by the motor 10 and sends air in a predetermined direction. The blade 90 forms an air flow that promotes heat exchange by the heat exchanger 104. The air flow formed by a rotation of the blade 90 sucks air outside the casing 102 into the fan chamber 102a inside the casing 102. In this process, the air passes through the heat exchanger 104 to exchange heat with the refrigerant, and then passes through the bell mouth 105 to be discharged to the outside of the casing 102.

(2) Configuration of Motor 10

Figure 3:
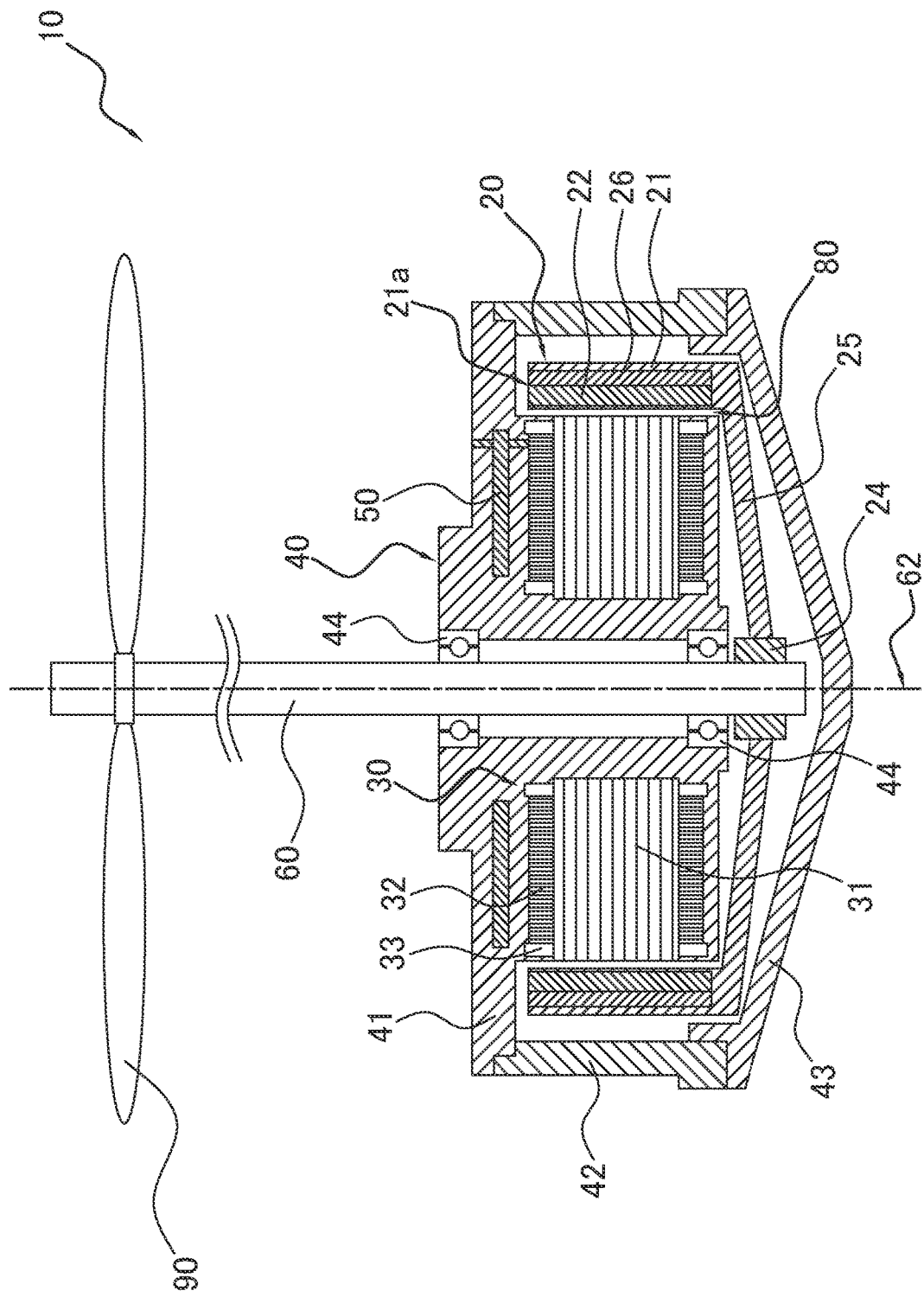
FIG. 3 is a longitudinal sectional view of a motor 10.

As shown in FIG. 3, the motor 10 mainly includes the rotor 20, a stator 30, a motor cover 40, a connection plate 50, and a shaft 60. The motor 10 is an outer rotor type motor. In other words, the stator 30 is disposed inside the rotor 20. FIG. 3 schematically shows the blade 90.

(2-1) Stator 30

The stator 30 mainly includes a stator core 31, a coil 32, and an insulator 33. The stator core 31 is formed by laminating steel plates that are conductive soft magnetic materials. The stator core 31 includes a plurality of teeth 31a. The coil 32 is formed by winding a copper wire coated with an insulating material such as enamel resin around the teeth 31a of the stator core 31. The insulator 33 is formed by an insulating resin material. The insulator 33 is provided between the stator core 31 and the coil 32. The insulator 33 insulates the stator core 31 from the coil 32 so that a current flowing through the coil 32 is not transmitted to the stator core 31. The stator core 31 has a through hole through which the shaft 60 penetrates along the axial direction.

(2-2) Rotor 20

Figure 4:
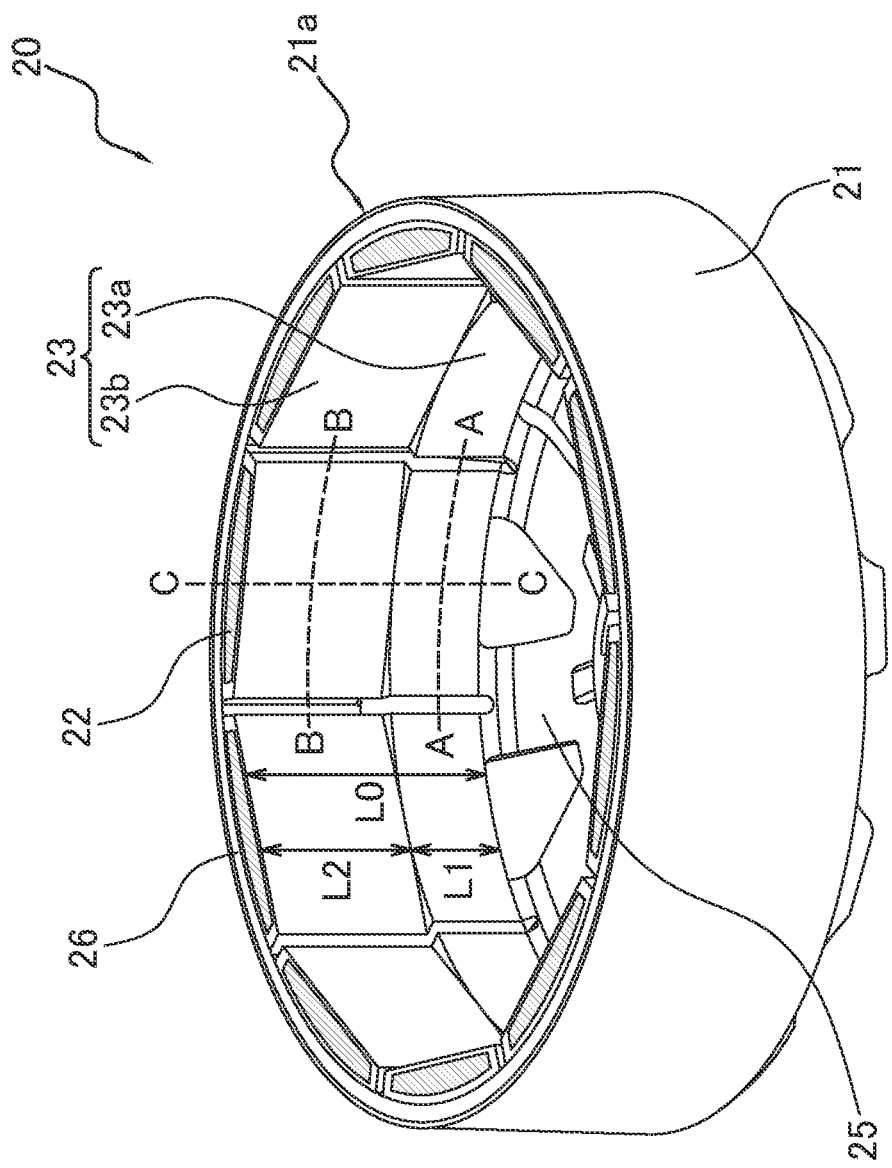
FIG. 4 is an external view of a rotor 20.
Figure 5:
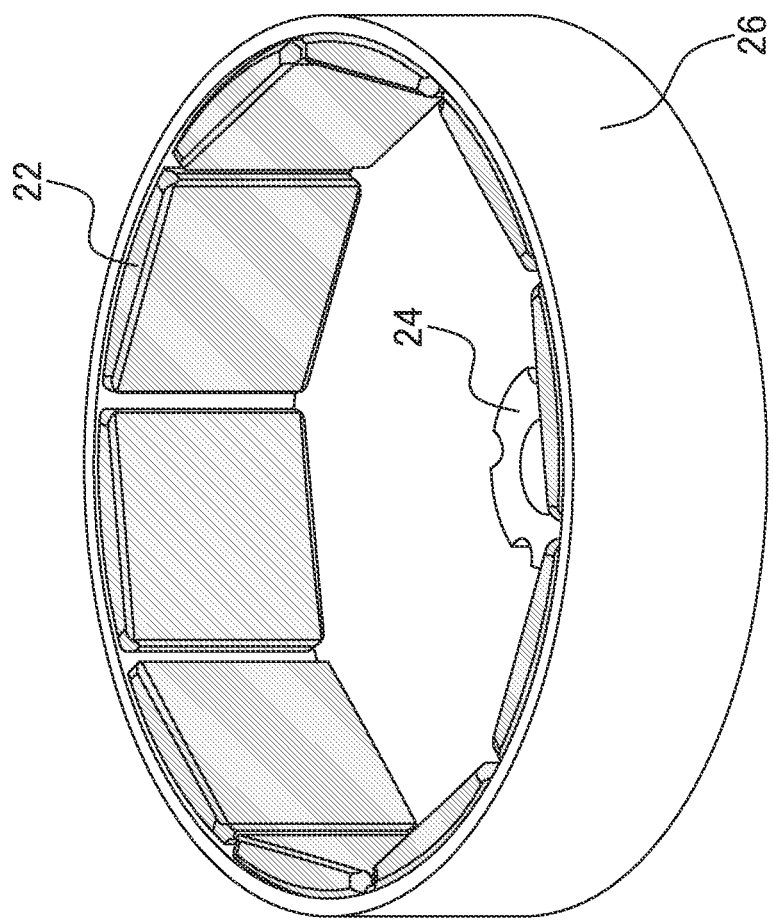
FIG. 5 is an external view of a plurality of magnets 22, a back yoke 26, and a boss core 24 accommodated in a mold.

As shown in FIGS. 4 and 5, the rotor 20 mainly includes a resin cylindrical portion 21, a plurality of magnets 22, a back yoke 26, and a boss core 24. In the following description, an "axial direction" refers to a direction of a center axis of the cylindrical portion 21, a "radial direction" refers to a radial direction centered on the center axis of the cylindrical portion 21, and a "circumferential direction" refers to a circumferential direction centered on the center axis of the cylindrical portion 21.

The rotor 20 is molded by resin casting. In the resin casting, a resin is poured into a cavity formed by the mold in a state where the plurality of magnets 22, the back yoke 26, and the boss core 24 are accommodated in the cavity as shown in FIG. 5. Thereafter, the rotor 20 is molded by curing the resin by heating or cooling. The magnets 22, the back yoke 26, and the boss core 24 are integrated by resin casting.

The rotor 20 is disposed outside of the stator 30 in the radial direction so as to be rotatable about an axis 62 of the shaft 60. A gap 80 is formed between an inner circumferential surface of the cylindrical portion 21 of the rotor 20 and an outer circumferential surface of the stator core 31 of the stator 30. A dimension of the gap 80 in the radial direction between the rotor 20 and the stator 30 is larger than 0 mm and 1 mm or less.

In the cylindrical portion 21, the plurality of magnets 22 are arranged side by side in the circumferential direction. An inner surface of the magnet 22 in the radial direction is a flat surface that is not curved. The magnets 22 are exposed on a side of an open end 21a as one end in the axial direction of the cylindrical portion 21. The back yoke 26 is located outside of the magnet 22 in the radial direction. The boss core 24 is engaged with the shaft 60 to couple the rotor 20 and the shaft 60. As a result, the rotor 20 rotates around the stator 30 integrally with the shaft 60. When the cylindrical portion 21 is viewed along the axial direction, the boss core 24 is located at the center of the cylindrical portion 21. The cylindrical portion 21 is connected to the boss core 24 via a plurality of resin coupling portions 25. The coupling portions 25 are formed integrally with the cylindrical portion 21 by resin casting.

As shown in FIG. 3, the boss core 24 is located on the opposite side of the open end 21a in the axial direction. On the opposite side of the open end 21a, an end of each magnet 22 is coupled to the boss core 24 via one coupling portion 25.

As shown in FIG. 4, the cylindrical portion 21 includes an inner resin 23 as a resin located inside the magnet 22 in the radial direction. The inner resin 23 includes a first resin portion 23a and a second resin portion 23b. The second resin portion 23b is a portion closer to the open end 21a than the first resin portion 23a in the axial direction. The second resin portion 23b is in contact with the first resin portion 23a in the axial direction and includes the open end 21a. The coupling portion 25 is in contact with the first resin portion 23a.

A dimension of the first resin portion 23a in the axial direction and a dimension of the second resin portion 23b in the axial direction are constant in the circumferential direction. In the axial direction, a dimension of the cylindrical portion 21 is equal to a sum of a dimension L1 of the first resin portion 23a and the dimension L2 of the second resin portion 23b. In the axial direction, the dimension L1 of the first resin portion 23a is 20% to 25% of a dimension L0 of the cylindrical portion 21 (see FIG. 4).

Figure 6:
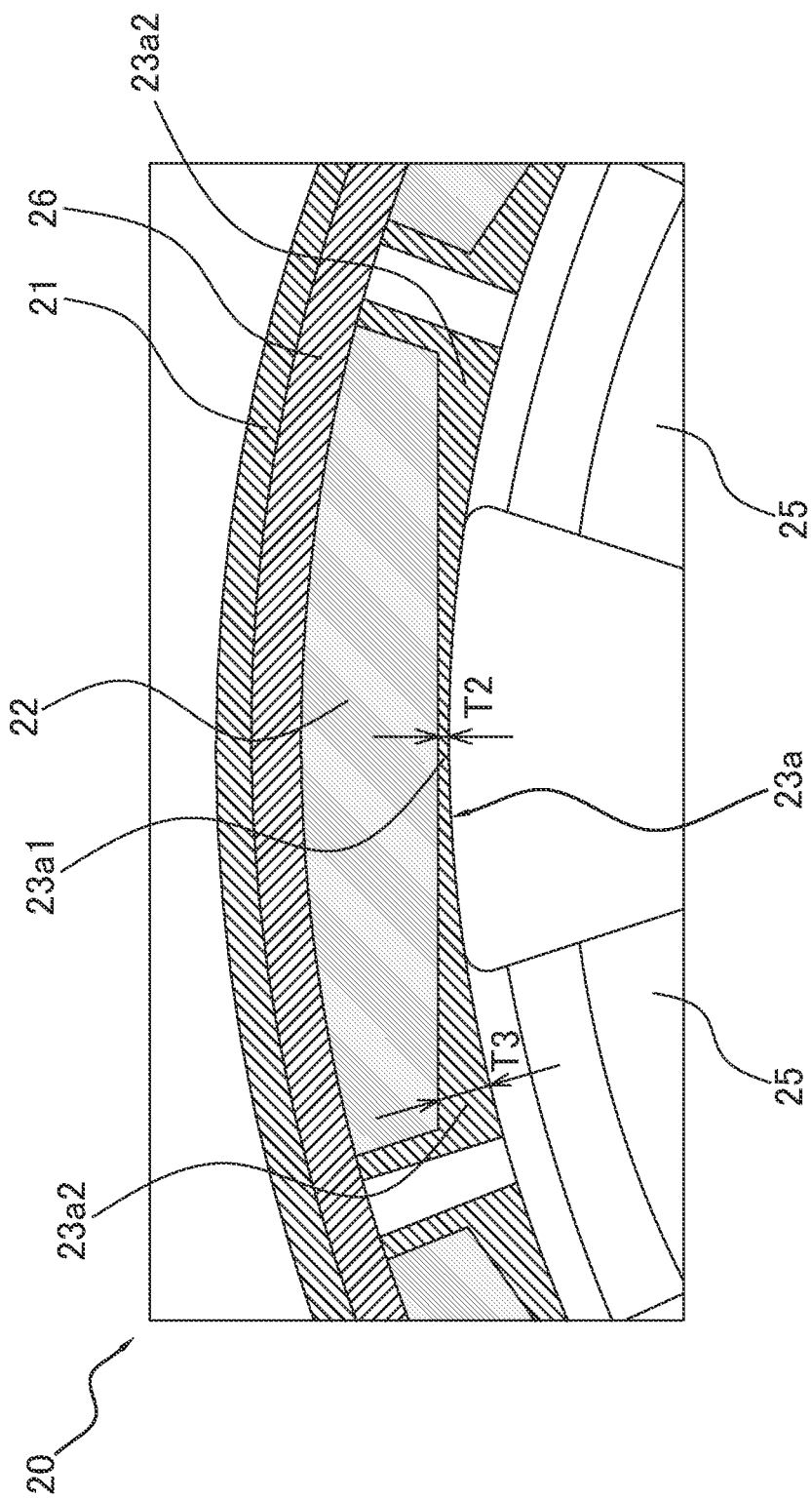
FIG. 6 is a sectional view of a first resin portion 23a of the rotor 20.
Figure 7:
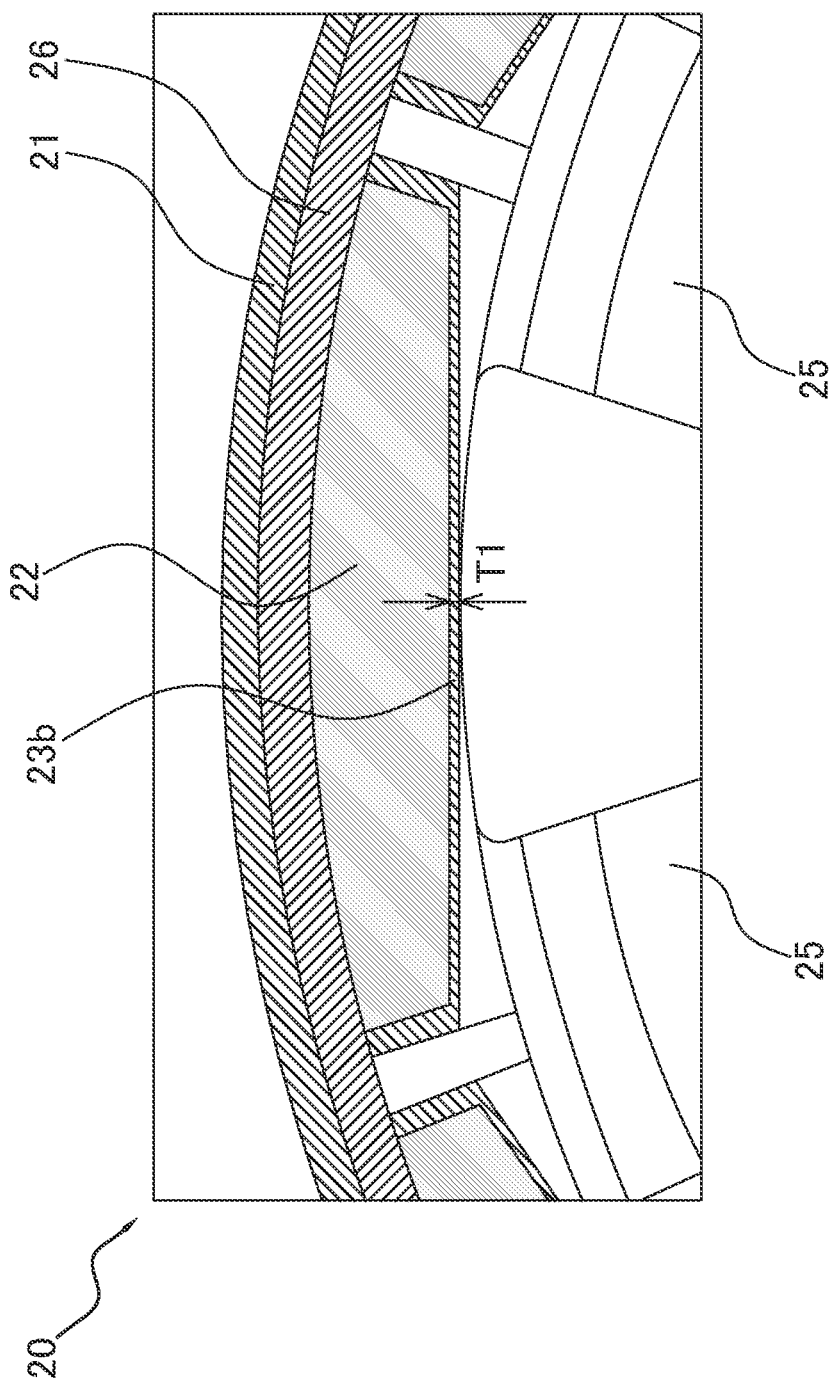
FIG. 7 is a sectional view of a second resin portion 23b of the rotor 20.

As shown in FIGS. 6 and 7, a sectional area of the second resin portion 23b perpendicular to the axial direction is smaller than a sectional area of the first resin portion 23a perpendicular to the axial direction. A dimension of the second resin portion 23b in the radial direction is constant along the axial direction. The dimension of the second resin portion 23b in the radial direction is 1 mm or less. Specifically, as shown in FIG. 7, in the second resin portion 23b, a resin layer having a constant thickness is formed on an inner plane of the magnet 22 in the radial direction. In this case, a thickness T1 of the second resin portion 23b is, for example, 1 mm or less.

As shown in FIG. 6, a sectional shape of the first resin portion 23a perpendicular to the axial direction is different from a sectional shape of the second resin portion 23b perpendicular to the axial direction. Specifically, the first resin portion 23a has a thin portion 23a1 located at a center in the circumferential direction and thick portions 23a2 located on both sides of the thin portion 23a1 in the circumferential direction. A dimension T2 of the thin portion 23a1 in the radial direction is equal to the thickness T1 of the second resin portion 23b, or slightly larger than the thickness T1 of the second resin portion 23b.

The dimension of the first resin portion 23a in the radial direction is from 1 mm to 3 mm. For example, the dimension T2 of the thin portion 23a1 in the radial direction is 1 mm, and a maximum value of a dimension T3 of each of the thick portions 23a2 in the radial direction is 3 mm. The dimension of the first resin portion 23a may gradually increase from the center in the circumferential direction toward both ends in the circumferential direction. In this case, the maximum value of the dimension T3 of the thick portion 23a2 in the radial direction is equal to the dimension of the first resin portion 23a at both ends in the circumferential direction (see FIG. 6).

(2-3) Motor cover 40

The motor cover 40 covers the stator 30 and the connection plate 50. The motor cover 40 mainly includes a first cover 41, a second cover 42, and a third cover 43. The first cover 41 covers the stator 30 while facing inside of the rotor 20 in the radial direction. The second cover 42 surrounds the rotor 20 from outside of the rotor 20 in the radial direction. The third cover 43 covers an end of the rotor 20 in the axial direction closer to the boss core 24. The motor cover 40, for example, is formed by bulk molding compound (BMC)

which is a thermosetting resin material. BMC is a resin material containing an unsaturated polyester resin as a main component to which a flame retardant such as aluminum hydroxide is added. The stator 30 is fixed to the motor cover 40. A bearing 44 for supporting the shaft 60 is attached to the motor cover 40. The bearing 44 is, for example, a metal ball bearing.

The motor cover 40 is fixed to the casing 102 of the outdoor unit 220 via a vibration-proof member. The vibration-proof member is molded by rubber or the like, and has a function of absorbing vibration of the motor 10.

(2-4) Connection Plate 50

The connection plate 50 is disposed inside the motor cover 40 and at one end of the stator 30 in the axial direction. The connection plate 50 is connected to a winding start wire and a winding end wire of the coil 32 of the stator 30. The connection plate 50 is connected to an external power source or the like via a lead wire.

(2-5) Shaft 60

The shaft 60 is a metal cylindrical member. As shown in FIG. 3, the shaft 60 is coupled to the blade 90 at one end in the axial direction, and is coupled to the boss core 24 of the rotor 20 at the other end in the axial direction. The shaft 60 is rotatably supported with respect to the motor cover 40 by the bearing 44 fixed to the motor cover 40.

The stator 30 generates a magnetic field for rotating the rotor 20 by power supplied from the outside to the coil 32 via the connection plate 50. The rotor 20 is rotated by the magnetic field generated from the stator 30. The shaft 60 coupled to the rotor 20 rotates about the axis 62 along the axial direction. The motor 10 transmits the rotational force to the blade 90 via the shaft 60 while supporting the shaft 60. As a result, the motor 10 rotates the blade 90 about the axis 62 of the shaft 60.

(3) Characteristics

The rotor 20 of the motor 10 according to the embodiment includes the inner resin 23 (the first resin portion 23a and the second resin portion 23b). The rotor 20 is molded by resin casting. The mold used for resin casting of the rotor 20 has the resin filling space 300 and the injection port 302 inside the mold. The resin filling space 300 is a space that is filled with resin to mold the rotor 20. The injection port 302 communicates with the resin filling space 300. The injection port 302 is a space for filling the resin filling space 300 with resin by injecting the resin from outside.

Figure 8:
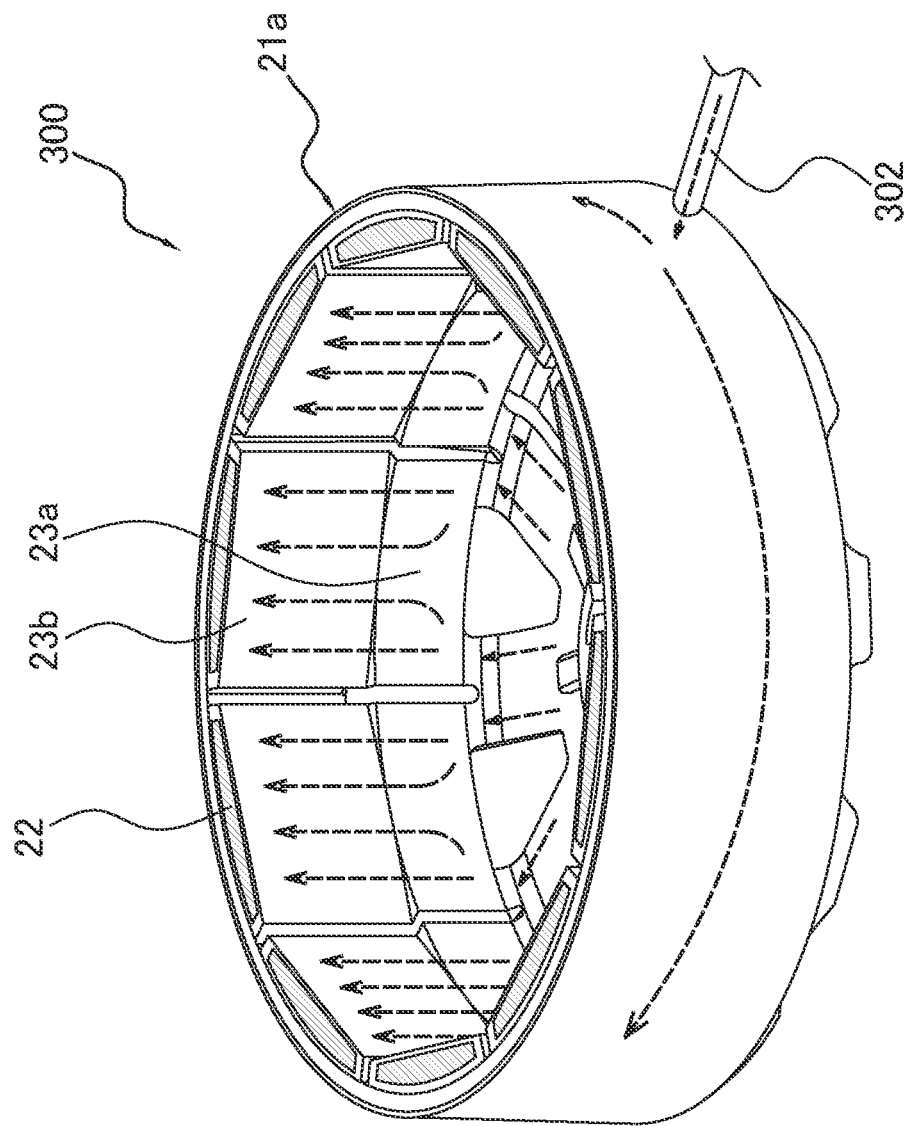
FIG. 8 is an external view of a resin filling space 300 which is a space inside the mold used for resin casting of the rotor 20.

The resin filling space 300 has the same shape as a shape in which the cylindrical portion 21 having the first resin portion 23a and the second resin portion 23b and the plurality of coupling portions 25 are connected. At the time when the resin is poured into the resin filling space 300, at least the plurality of magnets 22, the back yoke 26, and the boss core 24 are accommodated in the resin filling space 300. As shown in FIG. 8, the resin is injected into the resin filling space 300 from the injection port 302. In FIG. 8, a dotted arrow indicates a flow of the resin injected from the injection port 302 into the resin filling space 300. An injection port 302 is located at an end in the axial direction of the resin filling space 300, the end being opposite to the open end 21a of the rotor 20. Specifically, the injection port 302 is connected to an outer side surface of the resin filling space 300 in the radial direction at an end on a side where the boss core 24 is accommodated.

A process of filling the resin filling space 300 with the resin will be described. The resin poured into the resin filling space 300 from the injection port 302 first passes through a space forming the coupling portion 25 to fill a space forming the first resin portion 23a, and then fills a space forming the second resin portion 23b. Since the rotor 20 has the open end 21a which is not covered with the resin, a gas in the cavity inside the mold escapes from the open end 21a in the process of filling the resin filling space 300 with the resin.

The first resin portion 23a has the thin portion 23a1 and the thick portions 23a2 located on both sides of the thin portion 23a1 in the circumferential direction. The dimension T3 of the thick portion 23a2 in the radial direction is larger than the dimension T2 of the thin portion 23a1 in the radial direction. Therefore, in the resin filling space 300, a flow resistance of the space forming the thick portion 23a2 is smaller than a flow resistance of the space forming the thin portion 23a1.

The dimension T3 in the radial direction of the thick portion 23a2 of the first resin portion 23a is larger than the thickness T1 of the second resin portion 23b. The dimension T2 in the radial direction of the thin portion 23a1 of the first resin portion 23a is substantially equal to the thickness T1 of the second resin portion 23b. Therefore, in the resin filling space 300, a flow resistance of the space forming the first resin portion 23a is smaller than a flow resistance of the space forming the second resin portion 23b.

In the process of filling the resin filling space 300 with the resin, the resin flows from a space having a small flow resistance toward a space having a large flow resistance. Therefore, as shown in FIG. 8, the resin poured from the injection port 302 into the space forming the first resin portion 23a tends to flow from the space forming the first resin portion 23a having a small flow resistance toward the space forming the second resin portion 23b having a larger flow resistance. In other words, in the space forming the first resin portion 23a and the second resin portion 23b, the resin easily flows in the axial direction or in a direction substantially parallel to the axial direction from the side of the injection port 302 toward the side of the open end 21a. When the resin flows in the axial direction toward the open end 21a, a gas in the resin filling space 300 can escape from the open end 21a. Therefore, after the resin filling space 300 is filled with the resin, the gas hardly remains between the inner surface in the radial direction of the magnet 22 and the inner resin 23.

Figure 9:
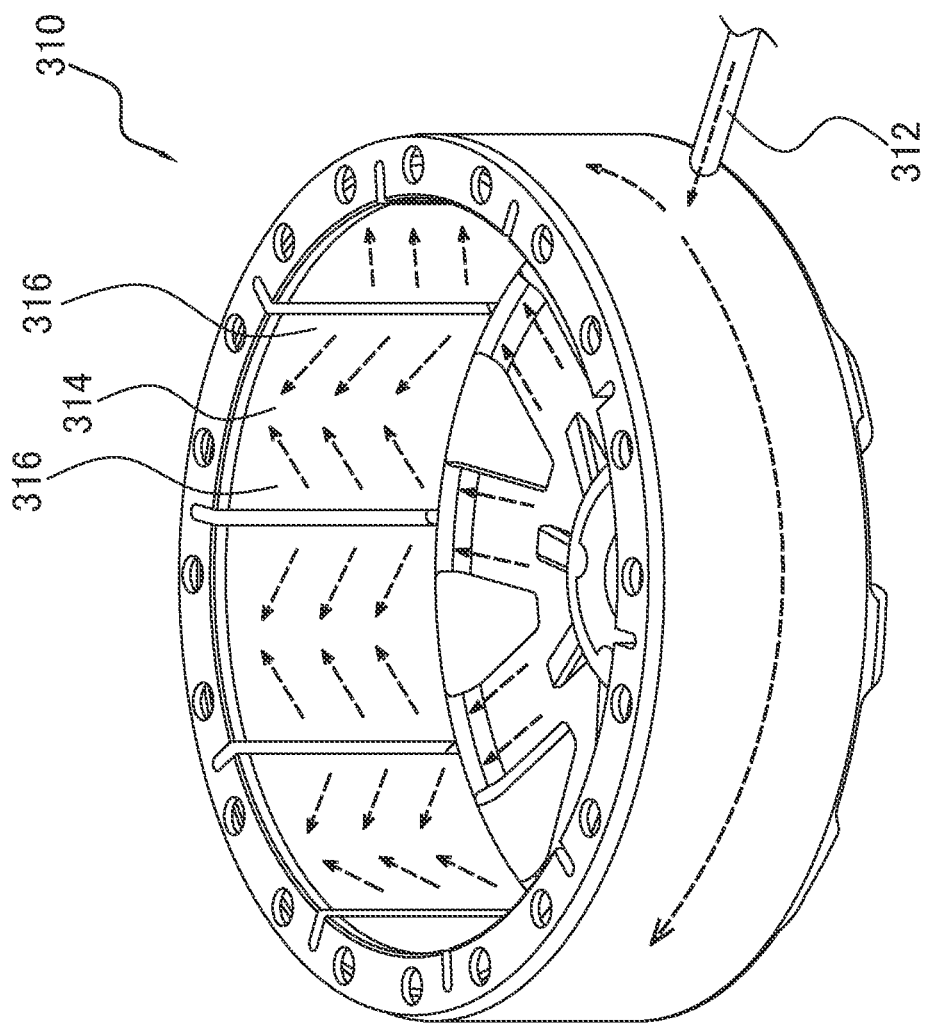
FIG. 9 is an external view of a resin filling space 310 which is a space inside the mold used for resin casting of the rotor as a comparative example.

FIG. 9 is an external view of a resin filling space 310 as a comparative example. In FIG. 9, a dotted arrow indicates a flow of the resin injected from an injection port 312 into the resin filling space 310. In FIG. 9, a sectional shape of the inner resin of the rotor is constant in the axial direction and is the same as the sectional shape of the first resin portion 23a according to the embodiment. Therefore, the space forming the inner resin of the rotor includes a thin portion space 314 at a center of the magnet in the circumferential direction and thick portion spaces 316 at both ends of the magnet in the circumferential direction. The thin portion space 314 corresponds to a space forming the thin portion 23a1 according to the embodiment. The thick portion space 316 corresponds to a space forming the thick portion 23a2 according to the embodiment. The injection port 312 is at the same position as the injection port 302 according to the embodiment.

The resin injected into the resin filling space 310 from the injection port 312 tends to flow from the thick portion space 316 having a small flow resistance toward the thin portion space 314 having a large flow resistance. Therefore, as shown in FIG. 9, in a space on the inner side of the magnet in the radial direction, the resin easily flows from both ends of the magnet in the circumferential direction (the thick portion spaces 316) toward the center of the magnet in the circumferential direction (the thin portion space 314). In this case, since the resin is filled from both ends of the magnet in the circumferential direction (the thick portion spaces 316), the center of the magnet in the circumferential direction (thin portion space 314) is the last portion to be filled with the resin. As a result, the gas in the resin filling space 310 tends to remain at the center of the magnet in the circumferential direction (the thin portion space 314). Furthermore, when the rotor does not have the open end 21a according to the embodiment, in other words, when the end of the magnets in the axial direction is covered with the resin, the gas in the resin filling space 310 does not escape from the end of the rotor in the axial direction, and thus the gas in the resin filling space 310 tends to remain.

If the gas remained between the inner surface of the magnet 22 in the radial direction and the inner resin 23, a swelling portion due to a residual gas would be formed on an inner circumferential surface of the rotor 20 after molding. The swelling portion is a portion where the resin swells inward in the radial direction from the inner circumferential surface of the rotor 20. In the comparative example of FIG. 9, the swelling portion is easily formed in the thin portion space 314 where the gas in the resin filling space 310 tends to remain. If the dimension in the radial direction of the swelling portion is larger than the dimension in the radial direction of the gap 80 between the rotor 20 and the stator 30, the swelling portion may come into contact with the stator 30 during rotation of the rotor 20. As a result, abnormal noise may occur during driving of the motor 10, or the motor 10 may fail, and thus a step of removing the swelling portion is required after molding of the rotor 20. For example, a step of scraping the swelling portion to expose an inner circumferential surface of the magnet 22 in the radial direction is required.

However, in the embodiment, since the gas hardly remains between the inner surface of the magnet 22 in the radial direction and the inner resin 23 due to the above-described reason, a step of removing the swelling portion formed on the inner circumferential surface of the rotor 20 by the residual gas after molding the rotor 20 by resin casting becomes unnecessary. As a result, the abnormal noise caused by the swelling portion formed on the inner circumferential surface of the rotor 20 coming into contact with the stator 30 is suppressed, and therefore, a noise generated from the motor 10 and the failure of the motor 10 are suppressed.

(4) Modifications (4-1) Modification A

Figure 10:
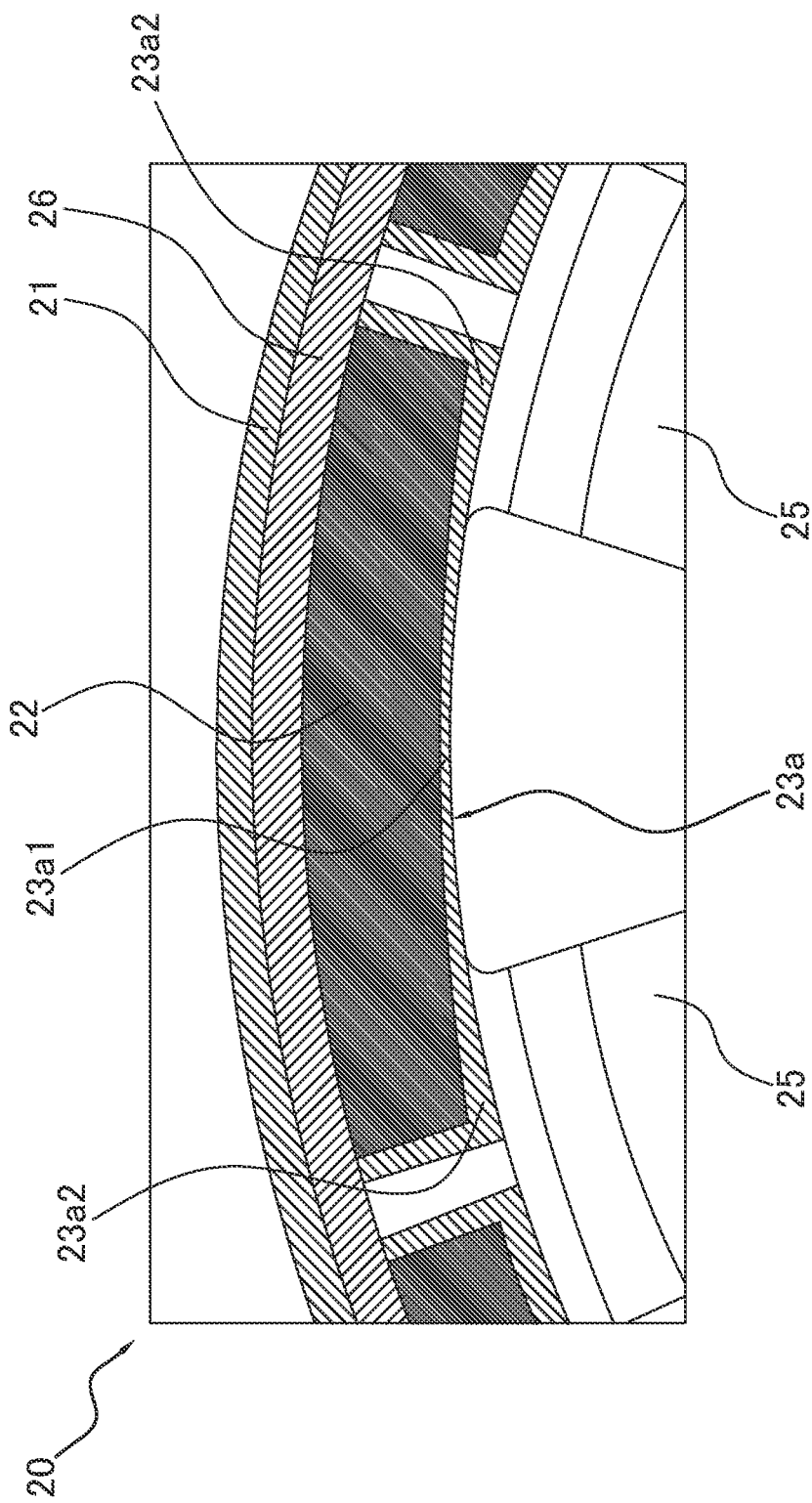
FIG. 10 is a sectional view of the first resin portion 23a of the rotor 20 of Modification A.
Figure 11:
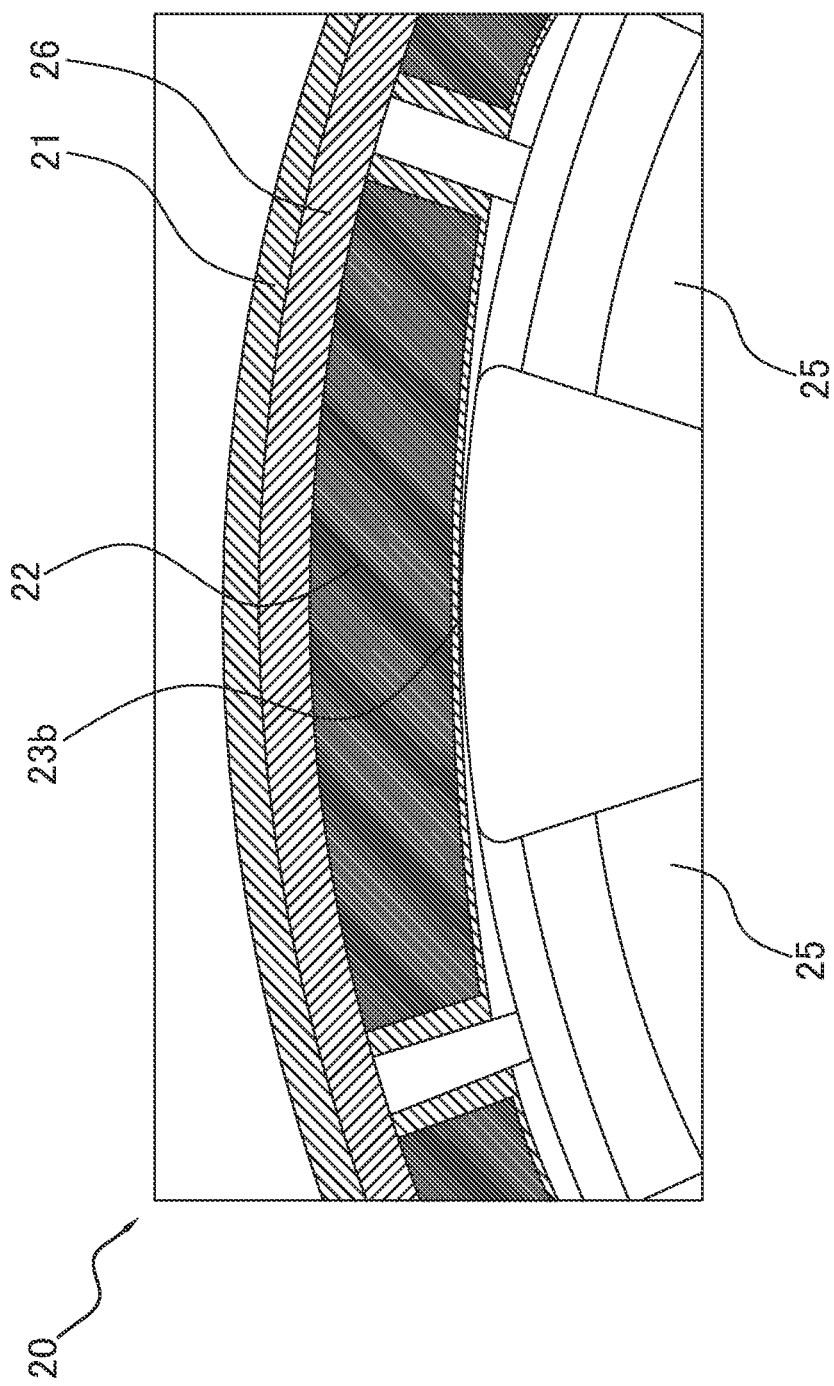
FIG. 11 is a sectional view of the second resin portion 23b of the rotor 20 of Modification A.

As shown in FIGS. 10 and 11, the inner surface of the magnet 22 in the radial direction may be curved in a concave shape inward in the radial direction. For example, the inner surface of the magnet 22 in the radial direction when viewed along the axial direction may have an arc shape.

In this modification, as shown in FIG. 10, the first resin portion 23a includes the thin portion 23a1 and the thick portions 23a2 located on both sides of the thin portion 23a1 in the circumferential direction. The dimension of the thin portion 23a1 in the radial direction is smaller than the dimension of each of the thick portions 23a2 in the radial direction. A dimension of the second resin portion 23b in the radial direction is constant in the circumferential direction. Specifically, as shown in FIG. 11, in the second resin portion 23b, a resin layer having a constant thickness is formed on an inner curved surface of the magnet 22 in the radial direction. In this case, the inner surface of the second resin portion 23b in the radial direction has the same curvature as the inner surface of the magnet 22 in the radial direction.

In this modification, as in the embodiment, in the space forming the first resin portion 23a and the second resin portion 23b, the resin easily flows in the axial direction or in a direction substantially parallel to the axial direction from the side of the first resin portion 23a toward the side of the open end 21a. Therefore, after the rotor 20 is molded by resin casting, the step of removing the swelling portion on the inner circumferential surface of the rotor 20 by the residual gas becomes unnecessary.

(4-2) Modification B

Figure 12:
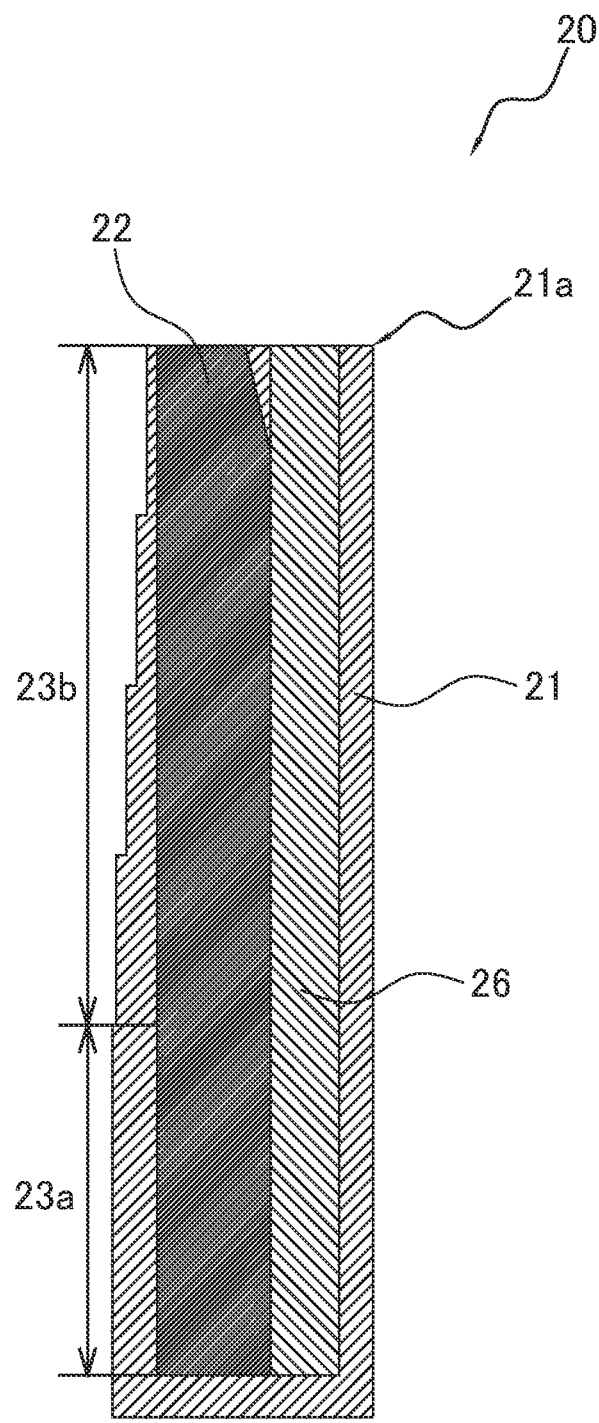
FIG. 12 is a sectional view of an inner resin 23 of Modification B perpendicular to an axial direction.

As shown in FIG. 12, the sectional area of the second resin portion 23b perpendicular to the axial direction may gradually decrease toward the open end 21a along the axial direction. In this case, in the process of filling the space forming the second resin portion 23b with the resin, the flow resistance of the space forming the second resin portion 23b gradually increases toward the open end 21a. As in the embodiment, the resin easily flows in the axial direction or in a direction substantially parallel to the axial direction from the side of the first resin portion 23a toward the side of the open end 21a.

(4-3) Modification C

Figure 13:
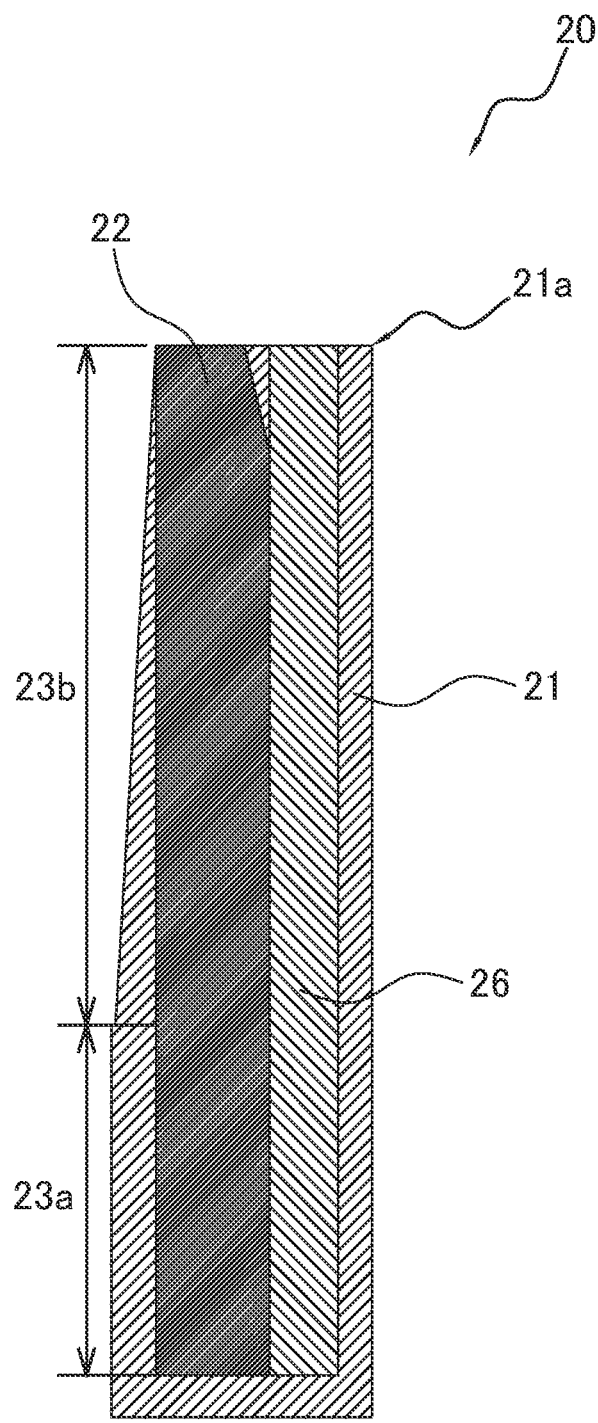
FIG. 13 is a sectional view of the inner resin 23 of Modification C perpendicular to the axial direction.

As shown in FIG. 13, the sectional area of the second resin portion 23b perpendicular to the axial direction may continuously decrease toward the open end 21a along the axial direction. In this case, in the process of filling the space forming the second resin portion 23b with the resin, the flow resistance of the space forming the second resin portion 23b gradually increases toward the open end 21a. As in the embodiment, the resin easily flows in the axial direction or in a direction substantially parallel to the axial direction from the side of the first resin portion 23a toward the side of the open end 21a.

(4-4) Modification D

At least a part of the inner surface of the magnet 22 in the radial direction may be exposed in a range at which the second resin portion 23b is located in the axial direction. In other words, at least a part of the second resin portion 23b may have a portion where no resin is present.

Alternatively, the second resin portion 23b does not need to be present. In other words, the sectional area of the second resin portion 23b perpendicular to the axial direction may be 0.

In this modification, in the process of filling the space forming the inner resin 23 with the resin, the gas in the resin filling space 300 easily escapes from the portion where the magnet 22 is exposed. Therefore, the gas hardly remains between the inner surface in the radial direction of the magnet 22 and the inner resin 23.

(4-5) Modification E

The air conditioner 200 may be a device that does not have a cooling function and a heating function but has an air cleaning function. In this case, the air conditioner 200 includes the fan 100 for sending clean air from which foreign matters and the like have been removed, and the motor 10 is used for the fan 100.

The motor 10 may be used for equipment and devices other than the fan 100 and the air conditioner 200.

(4-6) Modification F

The mold is used for resin casting of the rotor 20. The mold has the resin filling space 300 and the injection port 302 inside the mold. The resin filling space 300 is a space that is filled with resin to mold the rotor 20. The injection port 302 communicates with the resin filling space 300. The injection port 302 is a space for filling the resin filling space 300 with resin by injecting the resin from outside. The rotor 20 has the cylindrical portion 21 in which the plurality of magnets 22 are arranged side by side in the circumferential direction. The magnets 22 are exposed on a side of an open end 21a as one end in the axial direction of the cylindrical portion 21. The cylindrical portion 21 includes the inner resin 23 as a resin located inside the magnet 22 in the radial direction of the cylindrical portion 21. The inner resin 23 has the first resin portion 23a and the second resin portion 23b closer to the open end than the first resin portion 23a in the axial direction. The sectional area of the second resin portion 23b perpendicular to the axial direction is smaller than the sectional area of the first resin portion 23a perpendicular to the axial direction. At least the magnet 22 is accommodated in the resin filling space 300 when the resin is filled. The injection port 302 is located at an end in the axial direction of the resin filling space 300, the end being opposite to the open end 21a.

CONCLUSION

Although the embodiment of the present disclosure has been described above, it will be understood that various changes in form and details can be made without departing from the spirit and scope of the present disclosure described in the claims.

The invention claimed is:

1. A motor comprising:
a rotor molded by resin casting; and
a stator disposed inside the rotor,
the rotor including a cylindrical portion in which a plurality of magnets are arranged side by side in a circumferential direction,
the magnets being exposed on a side of an open end as one end of the cylindrical portion in an axial direction of the cylindrical portion,
the cylindrical portion including an inner resin located inside a radially innermost surface of each of the magnets in a radial direction of the cylindrical portion,
the inner resin including
a first resin portion contacting a radially innermost surface of each of the magnets, and
a second resin portion closer to the open end than the first resin portion in the axial direction, the second resin portion contacting a radially innermost surface of each of the magnets,
a sectional area of the second resin portion perpendicular to the axial direction being smaller than a sectional area of the first resin portion perpendicular to the axial direction.

2. The motor according to claim 1, wherein
the sectional area of the second resin portion perpendicular to the axial direction gradually decreases toward the open end along the axial direction.

3. The motor according to claim 1, wherein
the sectional area of the second resin portion perpendicular to the axial direction continuously decreases toward the open end along the axial direction.

4. The motor according to claim 1, wherein
a dimension of the second resin portion in the radial direction is constant along the axial direction.

5. The motor according to claim 1, wherein
at least a part of each of the magnets is exposed inside in the radial direction in a range at which the second resin portion is located in the axial direction.

6. The motor according to claim 1, wherein
the second resin portion is in contact with the first resin portion in the axial direction and includes the open end.

7. The motor according to claim 1, wherein
a dimension of the first resin portion in the axial direction is 20% to 25% of a dimension of the cylindrical portion in the axial direction.

8. The motor according to claim 1, wherein
the second resin portion has a dimension of 1 mm or less in the radial direction.

9. The motor according to claim 1, wherein
the first resin portion has a dimension of 1 mm to 3 mm in the radial direction.

10. The motor according to claim 1, wherein
an interval between the rotor and the stator is larger than 0 mm and not greater than 1 mm.

11. The motor according to claim 1, wherein
the rotor is molded by injecting resin from an injection port into an inside of a mold into which at least the magnets are inserted, and
the injection port is located at an end of the mold opposite to the open end.

12. A fan including the motor according to claim 1, the fan further comprising:
a blade driven by the motor.

13. An air conditioner including the fan according to claim 12, the air conditioner further comprising:
a casing, the fan being accommodated inside the casing.

* * * * *